No. 786,529. PATENTED APR. 4, 1905.
D. A. STAPLER.
DEVICE FOR APPLYING REMEDIES.
APPLICATION FILED APR. 18, 1904.

Witnesses:—

Inventor:
Desiderius A. Stapler
By Geo. H. Strong.
Atty

No. 786,529.

Patented April 4, 1905.

UNITED STATES PATENT OFFICE.

DESIDERIUS A. STAPLER, OF SAN FRANCISCO, CALIFORNIA.

DEVICE FOR APPLYING REMEDIES.

SPECIFICATION forming part of Letters Patent No. 786,529, dated April 4, 1905.

Application filed April 18, 1904. Serial No. 203,665.

*To all whom it may concern:*

Be it known that I, DESIDERIUS A. STAPLER, a citizen of the United States, residing in the city and county of San Francisco and State of California, have invented new and useful Improvements in Devices for Applying Remedies, of which the following is a specification.

My invention relates to a device which is especially designed for applying remedies or medicaments to wounds, cavities, and the like.

It consists in the combination of devices and in details of construction which will be more fully explained by reference to the accompanying drawings, in which—

Figure 1:
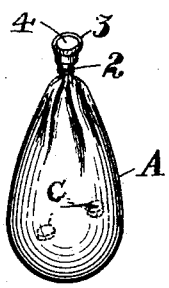
Figure 2:
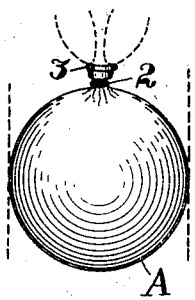

Figure 1 shows my device before capsule is broken. Fig. 2 is a view illustrating device expanded for use.

In the application of remedies, and especially where they are to be applied in inclosed cavities, it is common to use a tampon or pledget, which is designed to carry the remedy and to form a stopper to prevent the escape of said remedy from the cavity and to retain it in contact with the part to be treated.

It is the object of my invention to provide a flexible expansible tampon having a cavity or depression formed at one end within which the remedy may be contained and means for expanding the tampon to correspondingly expand and fill the cavity and to maintain the remedy or medicament in contact with the part to be treated.

As shown in the drawings, A is a flexible sack adapted to receive a liquid and a breakable capsule C, the contents of which when mixed with the liquid will form a sufficient amount of gas to expand the containing-envelop to the desired degree. The upper portion of this envelop is tightly tied or otherwise closed, forming a neck, as at 2, and from this point the outer or upper end is again expanded, forming an exterior cup-shaped receptacle, as at 3. Within this receptacle is placed any remedy or medicament which it is desired to apply and which is retained by the rim of the cup-shaped receptacle. Such a contained remedy is shown at 4. The device is then applied by inserting it into the cavity until the remedy or medicament is in contact with the part to be treated, and by compression the capsule contained within the main portion of the sack or envelop is crushed, so that its contents mingle with the liquid in the sack and a sufficient amount of gas is formed to expand the envelop and at the same time expand and fill the cavity, thus retaining it and the remedy carried by it in place and preventing their falling out. The expansion of the part by this device is also of assistance to the desired treatment.

Having thus described my invention, what I claim, and desire to secure by Letters Patent, is—

1. A device for the application of remedies said device comprising a liquid-containing expansible receiver and a means contained therein and which when ruptured mingles with the liquid to generate a gas and inflate the receiver, said receiver having a neck portion serving as a holder for an exposed medicament.

2. A device for applying remedies and medicaments, said device comprising an expansible envelop adapted to contain a liquid and a capsule which when broken generates a gas, an exterior cup-shaped receptacle carried at one end of the envelop and adapted to contain the medicament to be applied.

In testimony whereof I have hereunto set my hand in presence of two subscribing witnesses.

DESIDERIUS A. STAPLER.

Witnesses:
S. H. NOURSE,
JESSIE C. BRODIE.